United States Patent
Mathews et al.

(10) Patent No.: US 10,759,456 B2
(45) Date of Patent: Sep. 1, 2020

(54) LOCATION DETERMINATION SYSTEM

(71) Applicant: General Electric Company, Schenectady, NY (US)

(72) Inventors: Harry Kirk Mathews, Clifton Park, NY (US); James D. Brooks, Schenectady, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 426 days.

(21) Appl. No.: 15/439,090

(22) Filed: Feb. 22, 2017

(65) Prior Publication Data

US 2017/0158213 A1    Jun. 8, 2017

Related U.S. Application Data

(63) Continuation-in-part of application No. 11/998,103, filed on Nov. 27, 2007, now Pat. No. 9,606,240.

(51) Int. Cl.

| | |
|---|---|
| *B61L 25/02* | (2006.01) |
| *B60T 13/26* | (2006.01) |
| *B61L 3/00* | (2006.01) |
| *B61L 27/00* | (2006.01) |
| *B60T 7/12* | (2006.01) |
| *G01S 19/50* | (2010.01) |
| *G01C 21/28* | (2006.01) |
| *G01C 21/16* | (2006.01) |
| *G01S 19/47* | (2010.01) |

(Continued)

(52) U.S. Cl.
CPC ............. *B61L 25/02* (2013.01); *B60T 7/126* (2013.01); *B60T 13/26* (2013.01); *B61L 3/008* (2013.01); *B61L 27/0077* (2013.01); *G01C 21/165* (2013.01); *G01C 21/28* (2013.01); *G01S 19/215* (2013.01); *G01S 19/47* (2013.01); *G01S 19/50* (2013.01); *B60T 2210/36* (2013.01); *B61L 2205/04* (2013.01); *G01S 19/14* (2013.01)

(58) Field of Classification Search
CPC ...... B61L 25/02; B61L 3/008; B61L 27/0077; G01S 19/40; B60T 13/26
See application file for complete search history.

(56) References Cited

U.S. PATENT DOCUMENTS

| 5,129,605 A | 7/1992 | Burns et al. |
| 5,633,875 A | 5/1997 | Hershey et al. |

(Continued)

OTHER PUBLICATIONS

New York Air Brake, "Pocket Guide OEM Products", Systems for Heavy Haul Rail Vehicles, 13 pages.

*Primary Examiner* — Ramsey Refai
(74) *Attorney, Agent, or Firm* — John P. Darling; The Small Patent Law Group, LLC

(57) ABSTRACT

A location determination system includes one or more processors configured to determine a location of a vehicle system based on output from a location determination system onboard the vehicle system. The one or more processors also are configured to determine whether the location of the vehicle system as determined by the location determination system is accurate based on one or more of performance of the vehicle system, communication between two or more vehicles in the vehicle system, one or more other locations determined by one or more other location determination systems onboard the vehicle system, and/or operation of a brake system of the vehicle system.

10 Claims, 8 Drawing Sheets

(51) Int. Cl.
*G01S 19/21* (2010.01)
*G01S 19/14* (2010.01)

(56) References Cited

U.S. PATENT DOCUMENTS

| | | | |
|---|---|---|---|
| 5,682,139 A | | 10/1997 | Pradeep et al. |
| 5,740,547 A | * | 4/1998 | Kull ................. B61L 25/021 |
| | | | 246/122 R |
| 5,867,122 A | * | 2/1999 | Zahm ................... G01S 19/14 |
| | | | 342/357.33 |
| 5,893,043 A | * | 4/1999 | Moehlenbrink ........ B61L 3/004 |
| | | | 246/182 C |
| 5,917,434 A | | 6/1999 | Murphy |
| 6,087,965 A | | 7/2000 | Murphy |
| 6,218,961 B1 | | 4/2001 | Gross et al. |
| 6,253,143 B1 | * | 6/2001 | Silvernagle ............ B60K 31/04 |
| | | | 123/335 |
| 6,311,109 B1 | * | 10/2001 | Hawthorne ............. B61L 3/002 |
| | | | 246/122 R |
| 6,641,090 B2 | | 11/2003 | Meyer |
| 7,209,810 B2 | | 4/2007 | Meyer et al. |
| 7,966,126 B2 | | 6/2011 | Willis et al. |
| 2002/0103585 A1 | * | 8/2002 | Biess ..................... F02D 25/04 |
| | | | 701/33.4 |
| 2012/0072088 A1 | * | 3/2012 | Cutright ................ B60T 17/228 |
| | | | 701/70 |
| 2014/0343767 A1 | * | 11/2014 | Oswald ................ B60T 17/228 |
| | | | 701/19 |

* cited by examiner

LOCATION DETERMINATION SYSTEM

CROSS-REFERENCE TO RELATED APPLICATIONS

This application is a continuation-in-part of U.S. patent application Ser. No. 11/998,103, which was filed on 27 Nov. 2007, and the entire disclosure of which is incorporated herein by reference.

BACKGROUND

The subject matter described herein relates to determination of vehicle location, and to a system and method for accurately and timely determining location/distance information for vehicles on a route, including, for example, trains on their tracks.

A need presently exists in vehicular (i.e. train) asset management and control applications to provide accurate and timely distance information for vehicles along a route, such as, but not limited to, trains on their tracks. An automatic controller in a locomotive pacing application, for example, provides throttle (notch) and braking commands to a locomotive in order that the locomotive follow a pre-planned speed profile versus distance along the track. In such an application, it is necessary to know the real-time location of the locomotive along the track. A locomotive position sensor or location determination system is therefore required.

One of the critical components of an automatic train control system is a sensor or sensor system that can provide accurate real-time location of the train on the track. Such a system must display robustness to errors and disturbances that are likely to be encountered in the railroad environment to be safely deployed. Such a system, for example, must provide plausible position information even if the sensors employed become subject to transient errors or intermittent lapses.

One of two methods have been typically employed to provide a location determination system (LDS). The first is a "dead reckoning" method based on measured velocity, the latter derived from a measurement of the rotational rate of one or more wheels and the corresponding wheel diameter. Position is computed simply by integrating the speed measurement, starting from a known initial position value.

The second method is based on real-time measurement of geographic coordinates with a global positioning system (GPS) sensor (e.g., receiver). The coordinates are compared to route coordinates in a route database, and an association is made to a specific point in the database based on reducing the distance between the measured geographic location (latitude and longitude) and locations in the route database. More specifically, a Kalman filter has been employed in conjunction with orthogonal acceleration measurements, turn-rate measurements, and wheel-mounted tachometer information for tracking movement through turnouts (to determine route occupancy) and for estimating along-track position, but that does not take into consideration certain errors and disturbances such as, for example, cumulative distance errors that are likely to be encountered along the specific track.

Accordingly, a need exists for a reliable system and method for providing estimation of real-time vehicle distance along a route such as, but not limited to a train track, and that is robust to errors and disturbances that are likely to be encountered in the specific route, i.e. railroad environment, in order to be safely deployed and to ensure the distance estimation is accurate.

BRIEF DESCRIPTION

Briefly, in accordance with one embodiment of the inventive subject matter, a system and method are provided for determining vehicular location/distance along a route.

According to one embodiment, a vehicle location determination system (LDS) is configured to estimate a real-time location of the vehicle along a route in response solely to GPS information and vehicle speed information such that the estimated real time distance is robust to errors and disturbances associated with both the GPS information and vehicle speed information to ensure the estimated real time location information is accurate.

According to another embodiment, a method of determining real time location of a vehicle along a route includes measuring GPS information associated with the vehicle, measuring speed information associated with the vehicle, and estimating real time distance of the vehicle along the route solely in response to the GPS information and the vehicle speed information such that the estimated real time distance is robust to errors and disturbances associated with both the GPS information and vehicle speed information to ensure the estimated real time location information is accurate.

In one embodiment, a system (e.g., a location determination system) includes one or more processors (e.g., a controller that is onboard a vehicle) configured to determine a location of a vehicle system based on output from a location determination system onboard the vehicle system. The one or more processors also are configured to determine whether the location of the vehicle system as determined by the location determination system is accurate based on one or more of performance of the vehicle system, communication between two or more vehicles in the vehicle system, one or more other locations determined by one or more other location determination systems onboard the vehicle system, and/or operation of a brake system of the vehicle system.

In one embodiment, a method (e.g., for checking or verifying the accuracy of a location determined by a location determination system) includes obtaining locations determined by separate location determination systems onboard a vehicle system during movement of the vehicle system. The method also includes one or more of comparing actual movement of the vehicle system with planned movement of the vehicle system, and/or comparing the locations determined by the location determination systems. The method also includes determining that one or more of the locations determined by one or more of the location determination systems is inaccurate based on the one or more of comparing the actual movement with the planned movement or comparing the locations and implementing one or more actions responsive to determining that the one or more locations are inaccurate.

In one embodiment, a system (e.g., a location determination system) includes one or more processors configured to obtain locations determined by separate location determination systems onboard a vehicle system during movement of the vehicle system. The one or more processors also are configured to one or more of compare actual movement of the vehicle system with planned movement of the vehicle system or compare the locations determined by the location determination systems. The one or more processors also are configured to determine that one or more of the locations is inaccurate based on the one or more of comparing the actual movement with the planned movement or comparing the locations. The one or more processors are configured to implement one or more actions responsive to determining that the one or more locations are inaccurate.

DRAWINGS

These and other features, aspects, and advantages of the inventive subject matter will become better understood when the following detailed description is read with reference to the accompanying drawings in which like characters represent like parts throughout the drawings, wherein.

While the above-identified drawing figures set forth alternative embodiments, other embodiments of the inventive subject matter are also contemplated, as noted in the discussion. In all cases, this disclosure presents illustrated embodiments of the inventive subject matter by way of representation and not limitation. Numerous other modifications and embodiments can be devised by those skilled in the art which fall within the scope and spirit of the principles of the inventive subject matter.

DETAILED DESCRIPTION

Particular embodiments of a vehicle location determination system (LDS) are described herein below with reference to FIGS. 1-7. The embodiments employ vehicle GPS sensor measurements in conjunction with vehicle velocity information, and also employ a Kalman Filter for optimal estimation of real-time location position along a route. A Kalman Filter is employed in one embodiment to compensate for time lapses between successive GPS measurements, during which a fast-moving vehicle such as a train, for example, undergoes a significant change in position.

Kalman Filtering desirably provides a technique to implement an upper limit or maximum likelihood estimator in a recursive fashion to yield position measurements that are robust to several errors and disturbances common to the railroad environment, including without limitation, velocity bias due to unknown or changing wheel slippage and/or wheel diameter, which is caused by the gradual wear of the wheels. Although Kalman Filters are well known, the structure associated with a particular Kalman Filter is distinct to the problem to be solved when using such a Kalman Filter.

Another source of disturbances is the intermittent failure of the GPS sensor to provide accurate or timely geographic measurements, which arises when visibility to the GPS satellite constellation is compromised by travel, for example, through tunnels or along hilly or urban terrain.

The inventive subject matter is not so limited however, and that other sensor types, either for purpose of augmenting accuracy and robustness, or to achieve the same performance with less expensive or more reliable sensors, can just as easily be employed to achieve the desired results according to the principles described herein.

Figure 1:
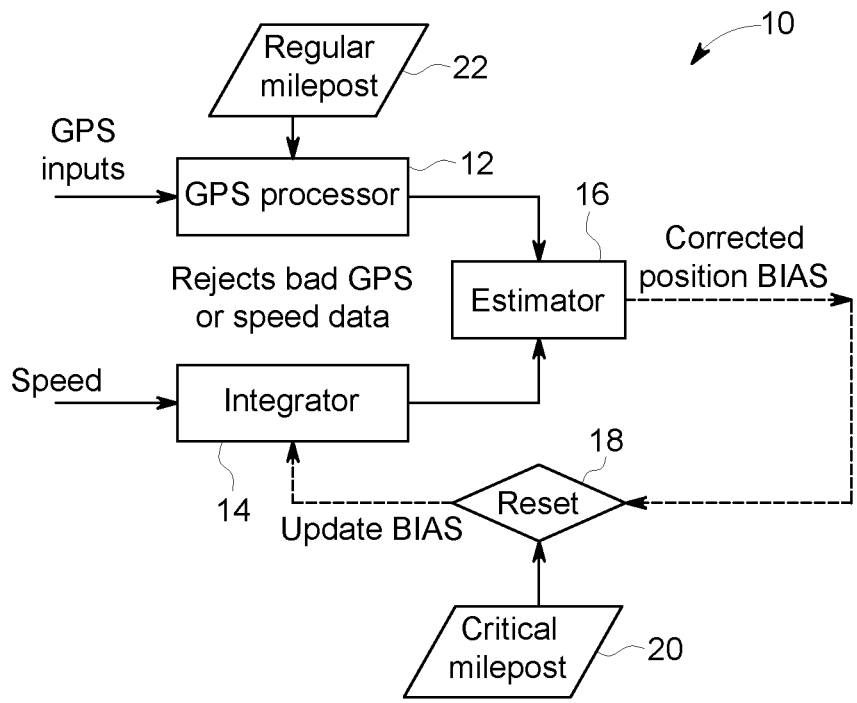
FIG. 1 is a flow chart illustrating the basic operation of a vehicle location determination system (LDS), in accordance with one embodiment of the inventive subject matter.

FIG. 1 illustrates a flow chart illustrates operation of a location determination system (LDS) 10, in accordance with one embodiment of the inventive subject matter. The LDS system 10 is a Kalman Filter-based system in which the Kalman Filter is configured to include a GPS processing module 12 that operates to receive and process the most recent GPS information via projection of GPS values onto a database. The modules described herein can represent hardware circuitry that includes and/or is connected with one or more processors (e.g., one or more microprocessors, field programmable gate arrays, and/or integrated circuits) that perform operations described herein under the direction of hard-wired or hard-coded software instructions and/or under the direction of one or more software applications stored on one or more computer-readable memories. Two or more modules can include the same hardware circuitry and/or processor(s), or can include different hardware circuitry and/or processors(s).

The projection calculation is carried out only when the presently active GPS sensor (enumerated as 204 in FIG. 8) transmits updated values (asynchronous in nature) that allow online identification of changes in Latitude/Longitude in one embodiment. A distance estimate is provided via a speed integration module 14 that also forms a portion of the Kalman Filter. A Kalman Filter estimator module 16 employs both GPS sensor data (204 in FIG. 8) and speed sensor data (enumerated as 206 in FIG. 8) to determine a robust distance measurement along a route. A reset feature module 18 also included within the Kalman Filter intermittently resets the estimator 16 and provides a corrected reference value of speed bias based on a critical milepost 20. Milepost module 20 comprises identified entries in the database where the estimator module 16 will be reset. Regular milepost module 22 comprises entries in the database with latitude/longitude and footage data that are employed during GPS processing.

Figure 2:
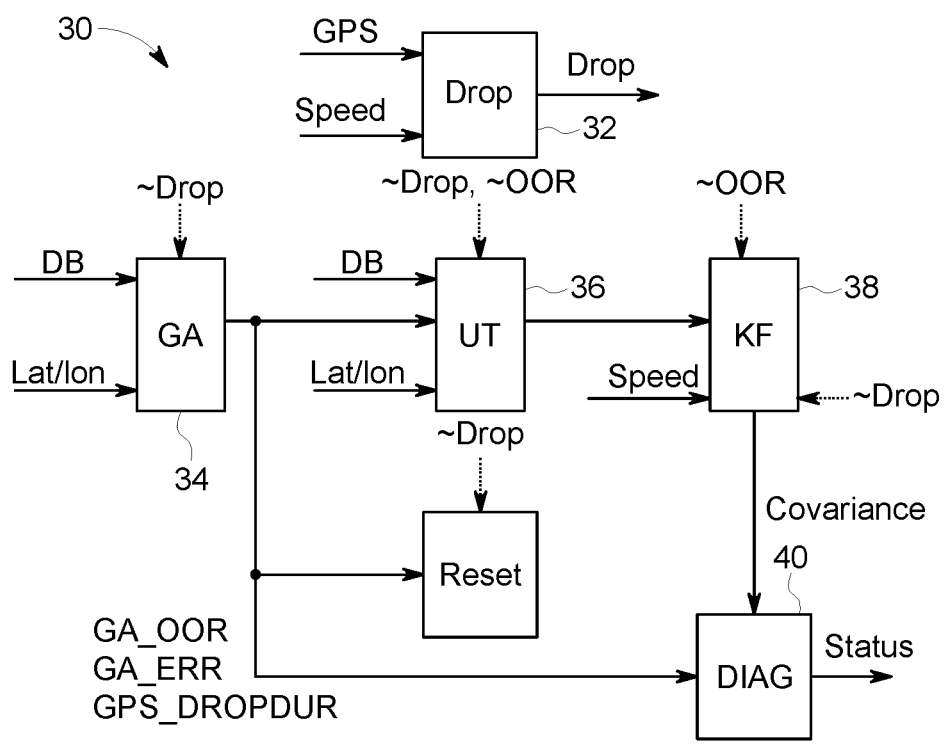
FIG. 2 is a flow chart illustrating in more detail, the various operations being carried out by the train LDS shown in FIG. 1, according to one embodiment.

FIG. 2 is a flow chart 30 illustrating in more detail, the various operations being carried out by the LDS 10 shown in FIG. 1, according to one embodiment. A drop identification module 32 looks at GPS values and determines whether they have updated in the present instant. Great arc (GA) sub-module 34 performs a GA calculation in association with the GPS processing carried out via GPS processing module 12 only when a GPS value updates. An unscented transformation (UT) sub-module 36 also included within the Kalman Filter GPS processing module 12 performs a UT for the covariance calculations required during GPS processing that is carried out only when the GPS value updates and the value is in range of the database. Kalman Filter (KF) module 38 is a Kalman Filter estimator used for fusing both the speed estimate and the present GPS value. A diagnostic module 40 sends out a status/goodness measure based on information, including without limitation, out of range data, error data, and dropped data indicators, received from various modules as shown in FIG. 2.

Figure 3:
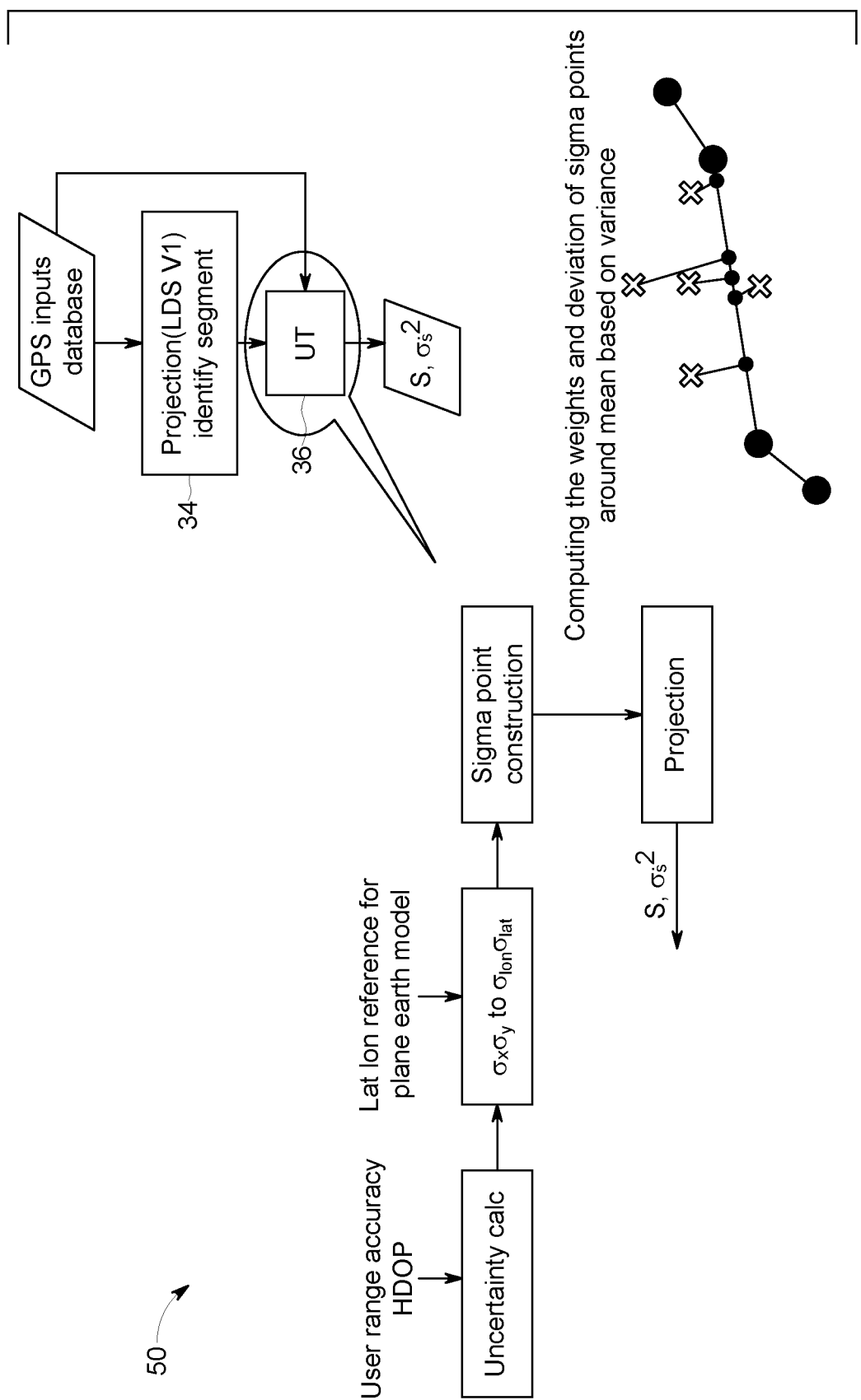
FIG. 3 is a flow chart illustrating operations performed by the LDS GPS processor shown in FIG. 1, and includes without limitation, the great arc projection and Unscented Transformation shown in FIG. 2, according to one embodiment.

FIG. 3 is a flow chart 50 illustrating operations performed by the LDS GPS processing module 12 shown in FIG. 1, and includes without limitation, the great arc projection 34 and unscented transformation 36 shown in FIG. 2, according to one embodiment. The great arc projection 34 is a series of mathematical calculations involving the orthogonal projection of latitude/longitude coordinates on a segment drawn between two latitude/longitude points from the database. This segment would then be a great arc, drawn such that is divides the earth into two halves when extrapolated around the sphere, as required for one embodiment, since these calculations are performed over a spherical coordinate system. The unscented transformation (UT) 36 is a technique suggested in literature for covariance calculations through nonlinear functions or operations. The UT 36 provides uncertainty in the position on route due to the uncertainty in the coordinates provided by the GPS information.

A quick search operation, according to one embodiment, is another function that can be implemented via the GPS processing module 12 that precedes the great arc calculation. Since the length of the database can be very great depending on the length of the track, it can be time consuming to carry out the rigorous great arc projection on all segments to identify the right one. A quick search operation therefore, which carries out a simple Euclidean distance calculation to determine the closest point in the database from the present GPS coordinate is then followed by the rigorous great arc calculation for only a small window around that closest point in the database.

Figure 4:
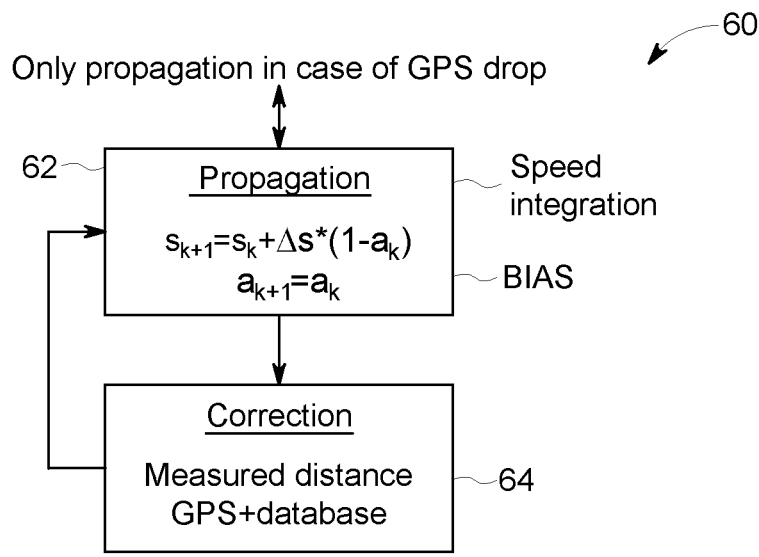
FIG. 4 is a flow chart illustrating operation of the LDS Kalman Filter estimator shown in FIG. 2, according to one embodiment.

FIG. 4 is a flow chart 60 illustrating operation of the LDS Kalman Filter estimator 38 used for data fusion of the speed and GPS information, shown in FIG. 2, according to one embodiment. Kalman Filter estimator module 38 provides the technical advantage of flexibility when integrating speed based distance estimates (available every 100 milliseconds, for example, according to one embodiment) with GPS based distance estimates (asynchronous update from 1 second to 10 seconds, for example, if it is an extended drop according to one embodiment). Kalman Filter estimator module 38 also provides the technical advantage of robustness to accommodate uncertainties that may occur with GPS or speed measurements.

The foregoing technical advantages are achieved by letting synchronous (constant rate) speed based distance updates be a part of the propagation step 62 and letting the GPS based distance estimate be a part of the correction step 64, carried out as and when the GPS information updates. The Kalman Filter estimator 38 has two states comprising 1) position along a route i.e. train track, and 2) speed bias, according to one embodiment. The bias in speed is the multiplicative bias which increases or decreases with speed, wherein the source for such a bias could be, for example, wheel slippage, incorrectly entered wheel diameter or change in the value due to wear. A technical advantage of estimating bias is increased accuracy available when relying on speed integration alone in a tunnel or a valley (GPS blind zone) where the pure speed integrator can drift away from the truth due to the bias in speed.

Figure 5:
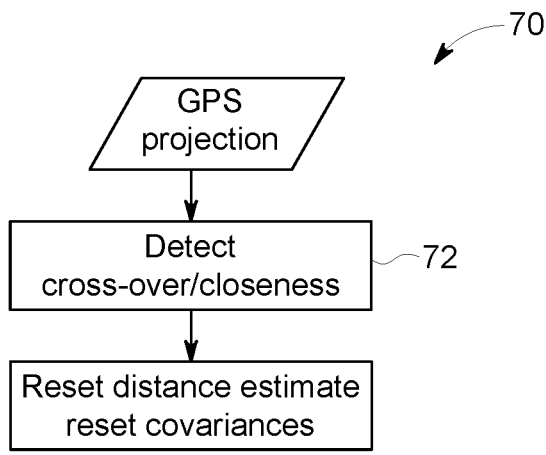
FIG. 5 is a flow chart illustrating operation of the LDS reset logic for the Kalman Filter shown in FIG. 2, according to one embodiment.

FIG. 5 is a flow chart 70 illustrating operation of the LDS reset logic for the Kalman Filter estimator 38 shown in FIG. 2, according to one embodiment. The LDS reset logic functions to recalibrate the distance estimate to the database value when, for example, a locomotive is at a station. The LDS reset logic also functions to reset the covariance values of the estimator discussed herein before so that no run away occurs for long trips. The foregoing functions are achieved by checking the closeness of the present coordinate to any of the identified critical mileposts 20 (entries in database identified for resets) as represented in block 72

Figure 6:
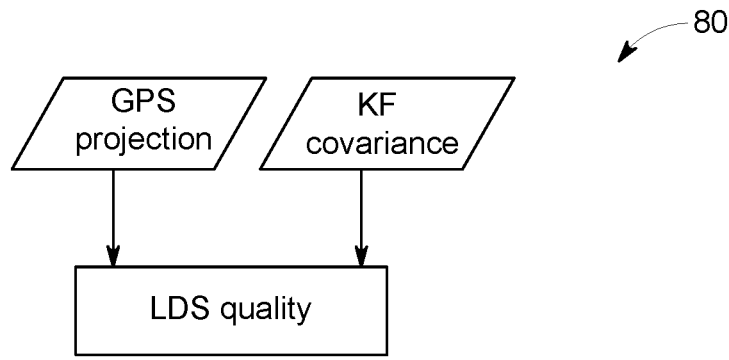
FIG. 6 is a flow chart illustrating diagnostic features of the LDS, according to one embodiment.

FIG. 6 is a flow chart 80 illustrating diagnostic features of the LDS 10 provided for by the diagnostic module 40 discussed herein before with reference to FIG. 2, according to one embodiment. The diagnostic module 40 checks three signals generated by the great arc module 34, including Out of Database Range, Projection Error and GPS Drop Duration signals. These signals are checked with respect to the provided thresholds; and the logic signals are converted into integer status signals. The diagnostic module 40 functions to monitor the Status signals as well as the covariance values associated with the Kalman Filter estimator 38 to provide a LDS quality estimate (i.e. 0-1 or 0-100%) which then indicates a measure of confidence to be assigned to the LDS distance estimate.

In summary, a location determination system (LDS) 10 for vehicles such as, but not limited to, trains, is implemented without the need for inertial navigation sensors such as required, for example, by some known route occupancy determination systems. LDS 10 employs features, including without limitation, estimator logic, including assignment and use of critical mileposts, as well as criteria for rejection of erroneous GPS coordinate data in accordance with the principles described herein. These features are not believed to exist in known location determination systems that offer solutions to different types of problems or that are otherwise incapable of providing LDS distance estimates anywhere near the levels of accuracy provided via LDS 10.

Figure 7:
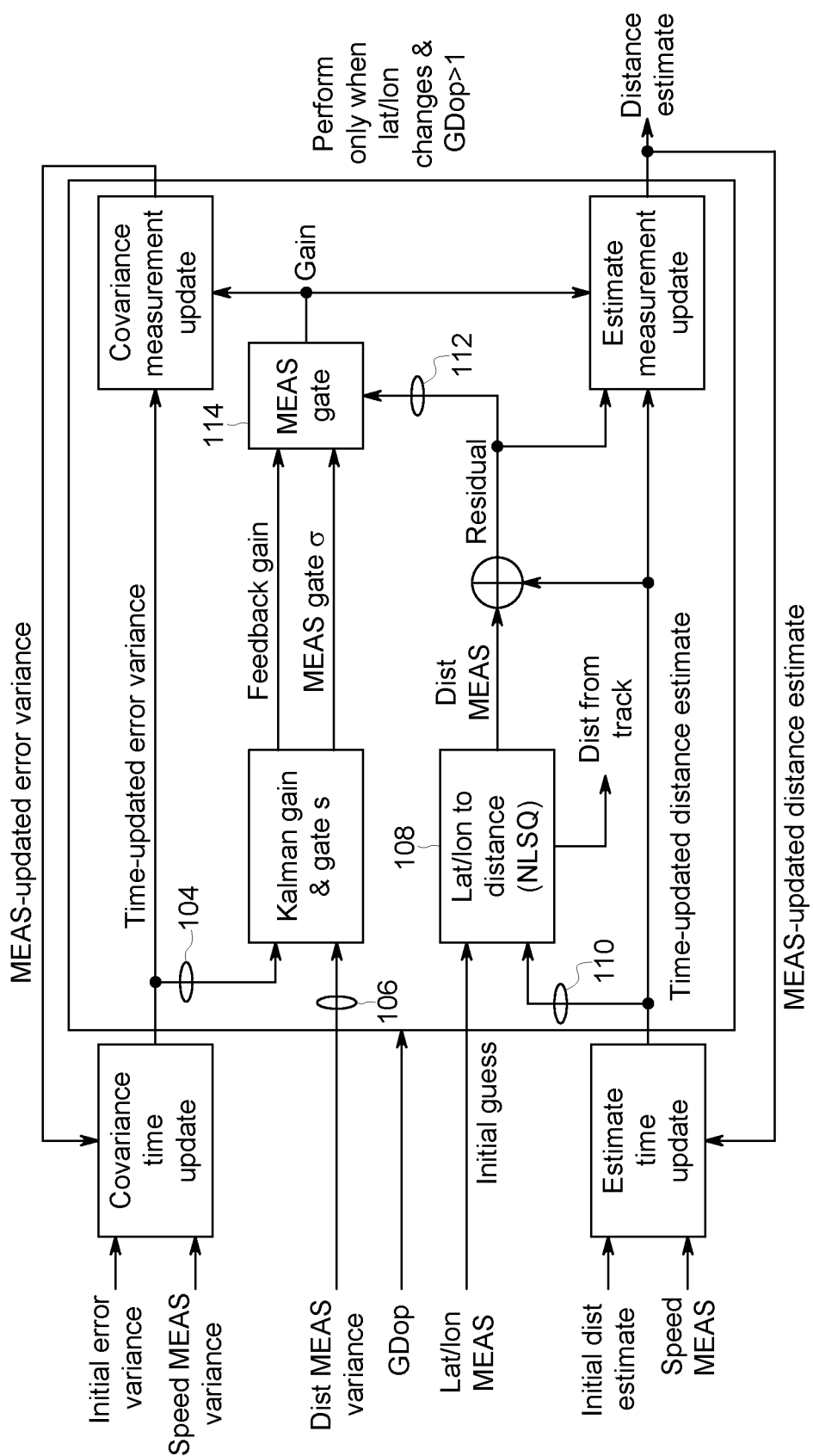
FIG. 7 is a flow diagram illustrating the basic operation of a vehicle location determination system (LDS), in accordance with another embodiment of the inventive subject matter.

FIG. 7 is a flow diagram illustrating the basic operation of a location determination system (LDS) 100 comprising a single-state Kalman Filter, in accordance with another embodiment of the inventive subject matter. LDS 100 functions to determine the distance of a vehicle along a route from a fixed reference point, given a (latitude, longitude) versus cumulative distance database, a vehicle speed, and GPS measurements using the single-state Kalman Filter in conjunction with a two-dimensional (2D) nonlinear least squares algorithm.

LDS 100 operates to acquire then maintain a route, and re-acquire whenever the route is lost. Specifically, the route is acquired in response to filtered GPS measurements; and whenever the GPS drops out (GDOP<threshold), the route is maintained following a vehicle speed measurement until the GPS returns. The route is lost if N consecutive good GPS measurements fall outside a predicted gate, wherein the auto throttle control, if it exists, should be disabled until the route is re-acquired.

The single-state Kalman Filter operates to estimate the distance on the route using the vehicle speed as a noisy input 104 and GPS information as a noisy measurement 106. The GPS distance measurement is obtained from GPS (latitude, longitude) via a nonlinear least squares (NLSQ) algorithm 108, using predicted distance from the Kalman Filter as an initial guess 110.

Measurement updates are performed only when GDOP is greater than a threshold, and the residual 112 is within a predicted Kσ gate 114. A standard Kalman Filter gain allows continuous trading between vehicle speed and GPS measurements via dynamically specifiable respective error variances.

LDS 100 provides technical advantages over other Kalman Filter based systems including without limitation, faster estimation of the distance of a vehicle along a route from a fixed reference point, as well as simpler algorithm implementation while simultaneously achieving the desired level of accuracy under certain conditions.

Figure 8:
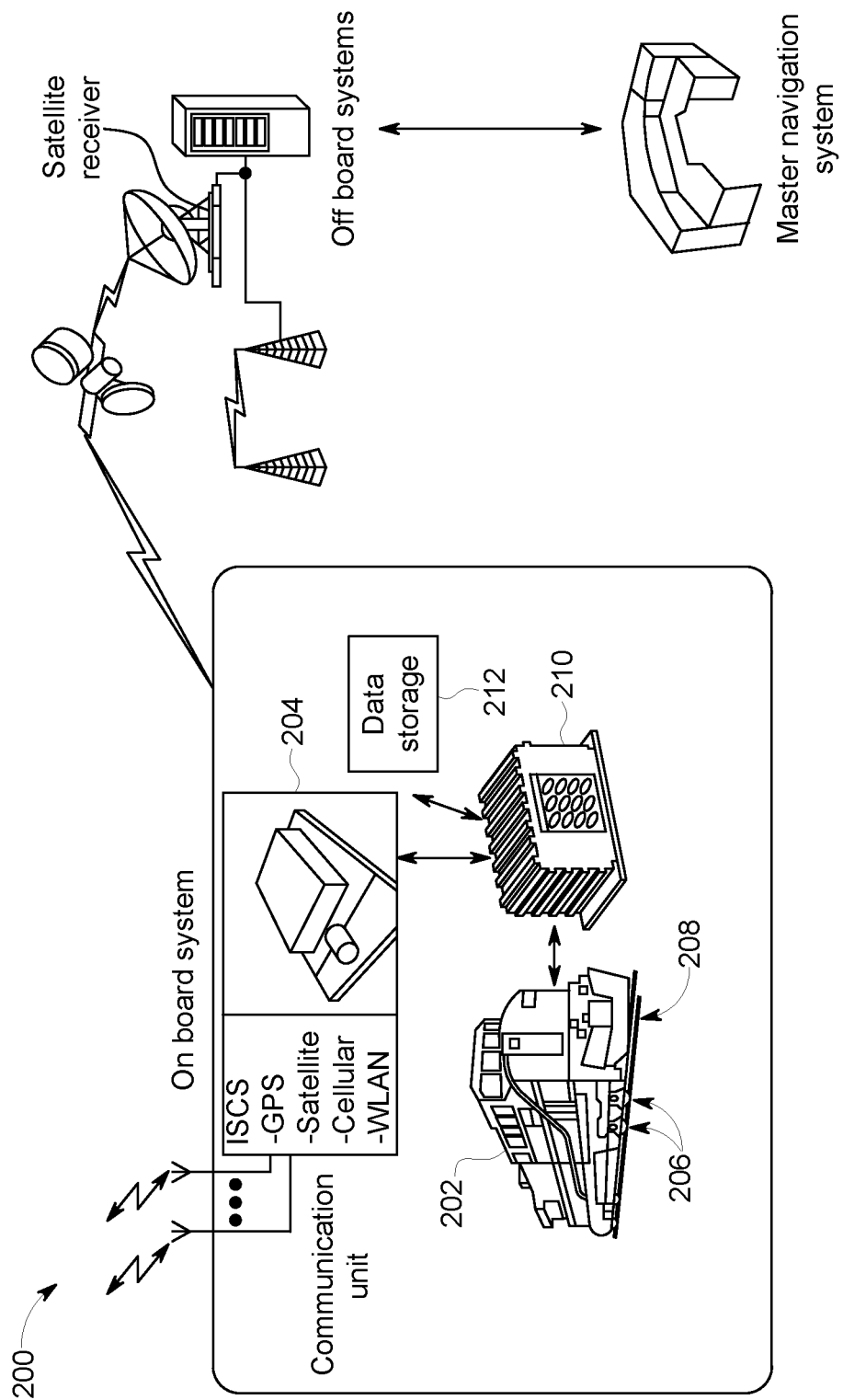
FIG. 8 is a pictorial diagram illustrating a location/distance determination system according to one embodiment.

FIG. 8 is a pictorial diagram illustrating a locomotive location/distance communication system 200 according to one embodiment. Locomotive location/distance communication system 200 depicts a vehicle 202 on a route 208 in which the vehicle 202 is configured with one or more GPS transceivers 204 and one or more speed sensors 206 that together operate to measure and send vehicle GPS data and locomotive speed data to an on-board LDS system 210 comprising great arc Kalman Filter 10 or non-linear least squares Kalman Filter 100. System 210 communicates with a master navigation system via a wireless communication system. Optionally, the vehicle 202 may be a locomotive and the route 208 is a track. Alternatively, the vehicle 202 is another type of vehicle, such as an automobile, a bus, a truck, a marine vessel, an aircraft, a mining vehicle, or another type of off-highway vehicle, such as a vehicle that is not designed or is not legally permitted for travel on public roadways. The route 208 alternatively may be a road, waterway, path in the air, or the like.

On-board LDS 210 may include without limitation, a computer or processor, logic, memory, storage, registers, timing, interrupts, and the input/output signal interfaces as required to perform the Kalman Filter processing described herein before. The LDS 210, according to one embodiment, receives inputs from a data storage unit 212 that may store a database of parameters such as described above, at least one on-board speed sensor 206, and at least one GPS unit 204. It will be appreciated that while in an exemplary embodiment, all or most processing is described as resident in the LDS 210, such a configuration is illustrative only. Various processing and functionality may be distributed among one or more system elements without deviating from the scope and breadth of the claims.

The data storage unit 212 is configured with sufficient capacity to capture and record data to facilitate performance of the GPS processing, speed integration, estimation, projection and reset functions disclosed herein. In one embodiment, data storage unit 212 uses flash memory. Data storage unit 212 may also include non-volatile random access memory (RAM). The data storage unit 212 is comprised in one embodiment, of a solid-state, non-volatile memory of sufficient storage capacity to provide long-term data storage. Once again, it will be appreciated that while the data storage unit 212 is described as a separate entity from the LDS 210, either or both could be configured to be separate or combined, as well as being combined with other elements of the communication system 200. Further, it should be appreciated that while particular processing and functionality is disclosed herein, such processing and functionality is illustrative only to facilitate disclosure.

Figure 9:
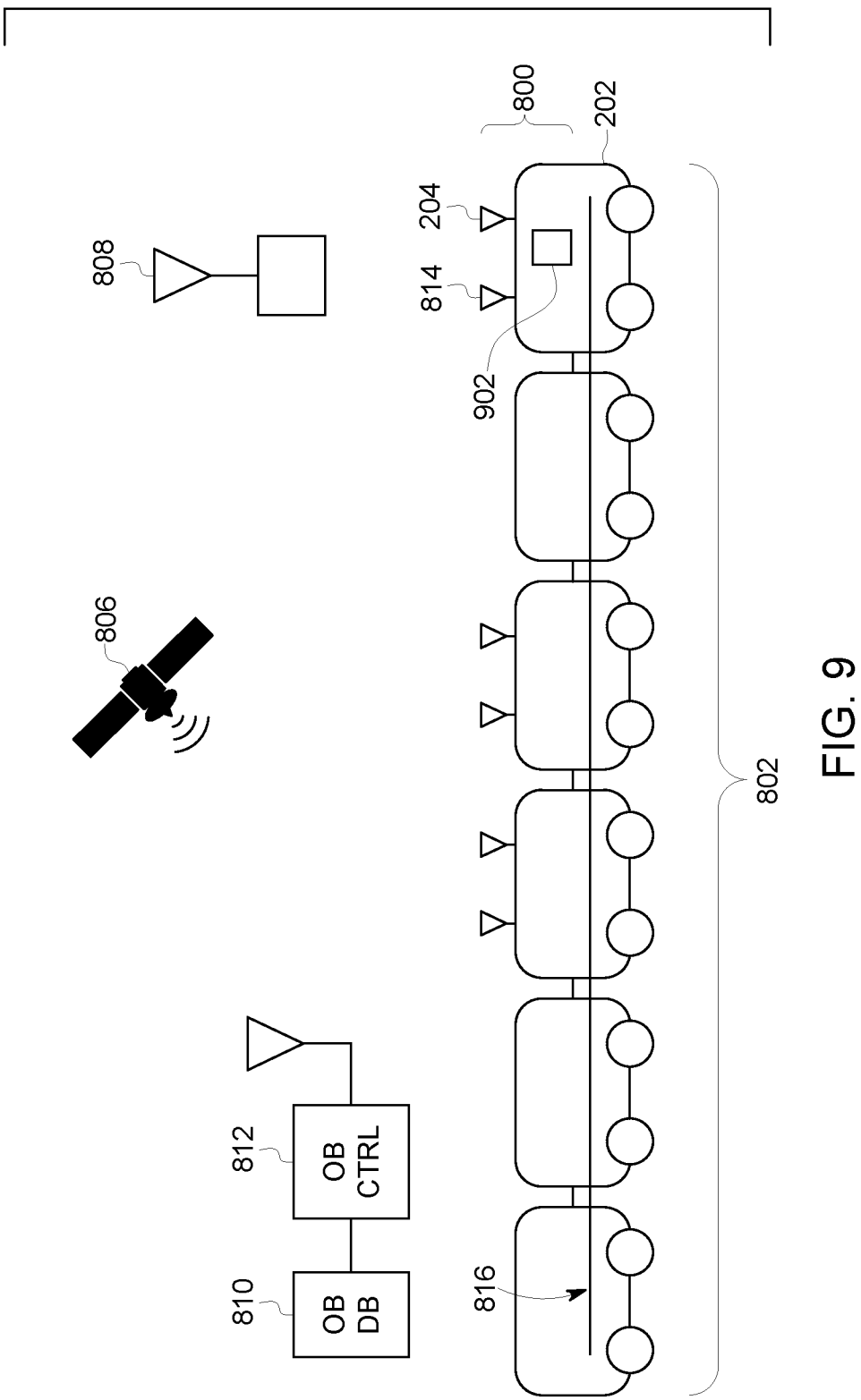
FIG. 9 illustrates an LDS security system according to one embodiment.

FIG. 9 illustrates an LDS security system 800 according to one embodiment. The security system 800 includes a controller 902 (described below) that operates to ensure that the locations of one or more vehicles 202 in a vehicle system 802 are accurate, and are not modified or based on a non-secure or erroneous source of information. For example, the vehicle system 802 can include one or more of the LDS 10, 100, 210 described herein for determining locations of the vehicles 202 and/or vehicle system 802. As described above, these determined locations are based at least in part on information received by a GPS unit 204, such as a GPS receiver. The vehicle system 802 represents one or more vehicles 202 that move together along routes. The vehicle system 802 can include a single vehicle 202 or multiple vehicles 202. In a vehicle system 802 having multiple vehicles 202, the vehicles 202 are mechanically coupled with each other in one embodiment, but are disconnected from each other in another embodiment. For example, the disconnected vehicles 202 can communicate with each other to coordinate relative movements of the vehicles 202 without mechanical connections between the vehicles 202.

The GPS unit 204 determines locations of the GPS unit 204 based on signals received from secure devices 806 that are remote from and off-board the vehicles 202, such as satellites. These devices 806 are secure in that the person or persons having access to change the information or signals communicated from the devices 806 to GPS units 204 is significantly limited. For example, only certain, select persons within a governmental entity or working for a designated private corporate entity may have the access and ability to change the signals communicated from the secure off-board devices 806 to GPS units 204 for use by the GPS units 204 to determine locations of the GPS units 204.

But, other persons or entities may attempt to interfere with the ability of the GPS units 204 to determine locations of the GPS units 204. These persons or entities may not be authorized to alter or change the signals sent from the devices 806, but may attempt to deceive one or more of the GPS units 204 by broadcasting incorrect signals from a spoofing device 808 (e.g., an antenna coupled with a computer or computing system that generates erroneous signals used by the GPS units 204 to determine locations). These signals may be structured to resemble a set of normal GPS signals (e.g., otherwise sent by the devices 806), or may be actual signals sent by the devices 806 at another time and/or location. These spoofed signals may be modified in such a way as to cause the GPS units 204 to estimate a position to be somewhere other than where the GPS unit 204 actually is, or to be located where the GPS unit 204 is located but at a different time.

One or more embodiments of the security system 800 operate to determine when spoofing signals are received by one or more GPS units 204 and/or operate to prevent receipt of one or more spoofing signals from disrupting or preventing safe operation of the vehicle system 802. Receipt of a spoofing signal at different times can be handled differently by the security system 800. For example, receipt of a spoofing signal at a GPS unit 204 prior to beginning movement on a trip by the vehicle system 802 can be detected and/or responded to differently than receipt of a spoofing signal while the vehicle system 802 is moving along a route.

Prior to beginning a trip (where the trip involves starting from a stationary position at a starting location and moving along one or more routes to a final location), a controller (shown and described below) onboard one or more of the vehicles 202 obtains trip data or trip information from a database. Optionally, the controller can obtain the trip data while the vehicles 202 are moving. This database is off-board the vehicle system 802 in one embodiment, and may be referred to as an off-board database 810 ("OB DB" in FIG. 9). An off-board controller 812 ("OB CTRL" in FIG. 9) represents hardware circuitry that includes and/or is connected with one or more processors (e.g., one or more microprocessors, field programmable gate arrays, and/or integrated circuits) that operate to control communication of the trip data to the onboard controller. Optionally, the trip data can be obtained by the onboard controller from a database located onboard the vehicle system 802 (referred to as an onboard database).

The trip data includes information used by the onboard controller to determine how to control operation of the vehicle system 802 during movement for the trip. For example, the trip data can represent a manifest that dictates how many vehicles are to be included in the vehicle system 802 (e.g., propulsion-generating vehicles 202 and/or non-propulsion-generating vehicles 202, such as rail cars, barges, trailers, or the like), the relative locations of the vehicles in the vehicle system 802, weights of the vehicles in the vehicle system 802, types of cargo carried by the vehicles in the vehicle system 802, a geographic location of a lead vehicle 202 in the vehicle system 802 (e.g., the vehicle 202 that remotely controls movements of other vehicles in the vehicle system 802 during movement), the route or routes to be traveled over by the vehicle system 802 during the trip, and the like. Optionally some parts of the trip data can be obtained from the off-board database while other parts of the trip data can be obtained from the onboard database.

The trip data includes or is stored in the database(s) with an identifier of the lead vehicle or of the vehicle system. For example, different lead vehicles can be associated with different unique identifiers, such as road numbers. Different road numbers and geographic locations of the lead vehicles can be associated with the trip data for a trip of a vehicle system in the database(s).

Spoofing the GPS unit(s) 204 of a lead vehicle 202 in a vehicle system 802 can prevent the correct trip data from being obtained from the database(s). For example, if the GPS unit 204 of a lead vehicle 202 determines that the lead vehicle 202 is in another location than the lead vehicle 202 actually is located due to receipt of spoofing signals, then the onboard controller and/or off-board controller may provide the trip data associated with another trip of another vehicle system and/or another lead vehicle 202. Because the onboard controller of the lead vehicle uses the trip data to determine how to control movement of the vehicle system, obtaining incorrect trip data can lead to unsafe operation of the vehicle system 802.

For example, the onboard controller can determine which throttle settings to operate at in order to ensure that the vehicle system 802 has sufficient momentum to travel up inclined portions of the routes and/or can determine which brake settings to use in order to ensure that the vehicle system 802 does not travel at unsafe or illegal speeds. These throttle settings and/or brake settings can be determined (by the onboard controller and/or by an energy management system). If the spoofed location of the GPS unit 204 causes the onboard controller to determine the settings based on incorrect trip data, then the onboard controller may use too low of a throttle setting to allow the vehicle system to travel up an incline, too high of a throttle setting to cause the vehicle system to travel at unsafe speeds (e.g., around curves, down declines, in congested areas, etc.), too low of a brake setting to safely slow or stop movement of the vehicle system, and/or too high of a brake setting to safely slow or stop movement of the vehicle system.

The security system 800 detects receipt of spoofed signals from the spoofing device 808 in one or more different manners. An onboard controller of the security system 800 can compare trip data that is received based on the location determined by a GPS unit 204 with one or more characteristics of the vehicle system 802 that are not determined based on the received trip data. If the trip data does not match or correspond with the characteristics, then the onboard controller can determine that the location determined by the GPS unit 204 is in accurate, and may be the result of spoofing the GPS unit 204.

In one embodiment, the onboard controller of the security system 800 can verify that the propulsion-generating vehicles 202 in the vehicle system 802 are communicatively coupled with each other. The onboard controller also can verify that these communicatively coupled vehicles 202 match or correspond with the vehicles 202 identified in the trip data obtained from the onboard and/or off-board databases (based on the location determined by a GPS unit 204). The vehicles 202 can include communication devices 814, such as radios or other transceivers, that wirelessly communicate with each other. The controllers onboard the vehicles 202 can wirelessly link with each other and communicate with each other so that the controller onboard the lead vehicle 202 can wirelessly communicate signals that remotely control throttles and/or brakes of the other vehicles 202 in the vehicle system 802. For example, the vehicle system 802 can operate as a distributed power (DP) system.

The onboard controller of the lead vehicle 202 can determine which other vehicles 202 are communicatively linked with the lead vehicle 202. The vehicles 202 share identifiers, such as road numbers, with each other via the communication devices 814, such as during the linking process of communicatively coupling the communication devices 814. The onboard controller can compare the identifiers of the vehicles 202 with the trip data to determine whether the received identifiers match or correspond with the identifiers in the trip data. If the identifiers match or correspond to the identifiers in the trip data, then the onboard controller can determine that the correct trip data was obtained. But, if the identifiers do not match or correspond with the identifiers in the trip data, then the onboard controller can determine that incorrect trip data was obtained.

Because the trip data is obtained based on the location determined by a GPS unit 204, obtaining or receiving the incorrect trip data can indicate that the GPS unit 204 incorrectly determined the location based on spoofed signals received from the spoofing device 808. Consequently, the onboard controller can determine that the determined location is inaccurate, that the GPS unit 204 has been spoofed, and/or that the received trip data is incorrect.

The vehicle system 802 includes a brake system that extends throughout all or a substantial portion of the vehicle system (e.g., through at least the propulsion-generating vehicles 202) in one embodiment. For example, the vehicle system 802 can include an air brake system that includes a conduit 816 extending through the vehicles in the vehicle system 802 and fluidly coupling air brakes in the vehicles with each other. The onboard controller can direct the brake system (e.g., a brake controller 912 of the brake system) to propagate an air brake signal along the length of this conduit. This signal can be generated as a change in pressure in the conduit that propagates along the length of the conduit.

Various characteristics of the pressure in the conduits of such brake systems can be indicative of actual lengths of vehicle systems and, therefore, the number of vehicles that are in the vehicle systems. For example, the integrated, or total, flow of air (e.g., cubic feet or centimeters of air) required from the vehicles 202 to make any given pressure change (e.g., such as a designated pressure change) in an air brake system is dependent upon on the length of the conduit which, in turn, is based on the number of vehicles fluidly coupled with each other in the vehicle system 802. Longer vehicle systems having longer conduits and more vehicles can require a greater amount of total air to pressurize the brake system (e.g., increase the air pressure to a designated pressure) than shorter vehicle systems having shorter conduits and fewer vehicles. As another example, the time for a pressure change to propagate in the conduits of a brake system along the length of a vehicle system can be dependent upon the actual length of the vehicle system. Longer vehicle systems having more vehicles and longer brake system conduits can require longer to propagate pressure changes from a leading end of the vehicle system (e.g., the lead vehicle) to an opposite end of the vehicle system (e.g., the end vehicle or an end-of-train, or EOT, device) when compared to shorter vehicle systems having fewer vehicles and shorter brake system conduits.

The total amount of air used to pressurize the air brake system can be calculated by integrating the rate of air flow into the conduits of the air brake system over the time needed for the pressure in the conduits to reach a designated pressure. The propagation time for a pressure change to move along the entire length of the vehicle system can be measured. The rate of air flow can be known or determined from pressure sensors and/or the pumps used to deliver the air, and the pressure in the brake system (at one or more locations) can be determined by one or more pressure sensors. If the actual length of the vehicle system based on the total air used to pressurize the brake system is greater or smaller than expected (e.g., more air or less air than a designated amount associated with the number of vehicles in the vehicle system as determined from the trip data), then the trip data can be determined to be incorrect. Additionally or alternatively, if the actual length of the vehicle system based on the propagation time needed for a pressure change to travel from one end to the opposite end of the vehicle system is longer or shorter than expected (e.g., it takes more time or less time than a designated propagation time associated with the number of vehicles in the vehicle system as determined from the trip data), then the trip data can be determined to be incorrect.

Because the trip data is obtained based on the location determined by a GPS unit 204, obtaining or receiving the incorrect trip data can indicate that the GPS unit 204 incorrectly determined the location based on spoofed signals received from the spoofing device 808. Consequently, the onboard controller can determine that the determined location is inaccurate, that the GPS unit 204 has been spoofed, and/or that the received trip data is incorrect.

Optionally, the time required to recharge the air within the brake system can be dependent upon the length of the vehicle system (e.g., the number of vehicles within the vehicle system). Longer vehicle systems having more vehicles have longer conduits in the air brake system, which can require longer to increase the pressure within the brake system when compared to shorter vehicle systems having fewer vehicles and shorter conduits. The brake controller of one or more vehicles can communicate pressures in the conduit during recharging of the air brake system back to the onboard controller of the lead vehicle 202. The onboard controller can determine the time needed to increase the pressure in the brake system by a designated amount. Different designated time periods can be associated with different lengths of vehicle systems. If the onboard controller determines that the recharging of the brake system is taking longer than expected, then the onboard controller can determine that the vehicle system has more vehicles than indicated by the trip data. This can indicate that the trip data is incorrect, and that the GPS unit 204 determined an incorrect location based on signals received from a spoofing device 808.

In one embodiment, the onboard controller of the security system 800 can verify that the trip data is correct by comparing the locations of the vehicles 202 (or the GPS units 204 onboard the vehicles 202) with the trip data. The GPS units 204 onboard the vehicles 202 can determine the locations of the GPS units 204 and the communication devices 814 can communicate these locations back to the onboard controller of the lead vehicle 202. The onboard controller can compare the number and/or relative locations of the vehicles 202 based on the received locations to the trip data. If the number and/or relative locations of the vehicles 202 match the information included in the trip data, then the onboard controller can determine that the trip data is correct or accurate. But, if the number and/or relative locations of the vehicles 202 does not match the information included in the trip data, then the onboard controller can determine that the trip data is not correct or is not accurate.

Because the trip data is obtained based on the location determined by a GPS unit 204, obtaining or receiving the incorrect trip data can indicate that one or more of the GPS units 204 incorrectly determined the location based on spoofed signals received from the spoofing device 808. Consequently, the onboard controller can determine that the determined locations are inaccurate, that the GPS unit 204 has been spoofed, and/or that the received trip data is incorrect.

Responsive to determining that the trip data is incorrect, the onboard controller implement one or more responsive actions. For example, the controller can prevent the vehicle system from beginning or otherwise embarking on the trip.

During movement of the vehicle system in a trip, the onboard controller can determine whether one or more of the GPS units 204 has been or is being spoofed. In one embodiment, the onboard controller receives the locations determined by GPS units 204 onboard different vehicles in the same vehicle system 802 and optionally as determined by one or more GPS units 204 disposed onboard a vehicle of another, separate vehicle system. This other vehicle system can be a vehicle system traveling on a nearby route.

The onboard controller can examine the locations and/or changes in the locations determined by multiple GPS units 204 to determine whether one or more, or all, of the GPS units 204 are determining the locations based on signals from the spoofing device 808. If the location(s) determined by one or more of the GPS units 204 change or indicate movement at a significantly greater rate (e.g., more than 30% faster) than the location(s) determined by one or more, or all, other GPS units 204, then this can indicate that at least one of the GPS units 204 is determining an incorrect location based on the signals received from a spoofing device 808.

In another example, the onboard controller can compare actual operation of the vehicle system 802 relative to planned operation of the vehicle system 802. For example, if the vehicle system 802 is traveling up an incline based on the location determined by a GPS unit 204 and a map of the route, then the speed of the vehicle system 802 should not increase or the tractive effort generated by a propulsion system of the vehicle system 802 should increase. But, if the speed is not decreasing and the tractive effort of the vehicle system 802 is not increasing, then the onboard controller can determine that the vehicle system 802 is not traveling up an incline. This can indicate that the location determined by the GPS unit 204 is incorrect and may be based on a signal from the spoofing device 808. As another example, if the vehicle system 802 is traveling down a decline based on the location determined by a GPS unit 204 and a map of the route, then the speed of the vehicle system 802 should increase or the tractive effort generated by a propulsion system of the vehicle system 802 should decrease. But, if the speed is not increasing and the tractive effort of the vehicle system 802 is decreasing, then the onboard controller can determine that the vehicle system 802 is not traveling down a decline. This can indicate that the location determined by the GPS unit 204 is incorrect and may be based on a signal from the spoofing device 808.

Optionally, one or more feature detection sensors of the security system 800 are used to determine, provide, or obtain locations of the vehicle 202 and/or a GPS unit 202 that is separate from and/or independent from any signals received from the spoofing device 808 and optionally from the devices 806. The feature detection sensors can be used to determine when a vehicle 202 having a GPS unit 204 is at or near a landmark having a known or previously determined location. The location determined by the GPS unit 204 onboard this same vehicle 202 can be compared with the known location of the landmark (which can be stored in the onboard and/or off-board database and communicated to the onboard controller). The onboard controller compares the location determined by the GPS unit 204 with the known location of the landmark. If the difference these locations is more than a designated amount (e.g., more than a smallest distance between the route being traveled upon and the landmark, more than 100 meters, or another limit), then the onboard controller can determine that the location determined by the GPS unit 204 is inaccurate. The onboard controller can determine that the inaccurate location is the result of the GPS unit 204 determining the location based on spoofing signals received from the spoofing device 808.

Optionally, the onboard controller can compare the locations determined by multiple GPS units 204 onboard different vehicles 202 as the vehicles 202 move past the same landmark. If these locations determined by the onboard controller are within a designated distance from each other (e.g., within the tolerances of the GPS units 204, within 10% of each other, or another limit), then the onboard controller can determine that the GPS units 204 are not being spoofed. But, if one or more of the GPS units 204 determine locations that are outside of the designated distance or limit from the locations determined by other GPS units 204, then the onboard controller may determine that the one or more GPS units 204 are determining incorrect locations due to spoofing signals received from the spoofing device 808. This comparison of the locations determined by the GPS units 204 can be used to determine which GPS units 204 are determining incorrect locations without the onboard controller having knowledge of or access to the actual or designated location of the landmark.

The landmarks that are used can be a variety of objects. For example, an intersection between routes, a switch between routes, a sign, a signal, a curve in the route, a peak in the route, a valley in the route, grade changes in the route, etc., can be used as a landmark. As various vehicles 202 move by the same landmark, the landmark detection sensors can provide signals to the onboard controller and/or the GPS units 204 onboard the same vehicles 202. The locations determined by the GPS units 204 as the vehicles 202 move by the same landmark can then be used by the onboard controller to examine the accuracy of the locations, as described above.

Responsive to determining that one or more of the GPS units 204 has been or is being spoofed, the onboard controller implements one or more responsive actions in one embodiment. The onboard controller can determine and correct for a spoofing bias caused by the spoofing of a GPS unit 204. The spoofing bias is the difference between the location coordinates determined by the GPS unit 204 due to the spoofing by the spoofing device 808 and the actual location coordinates. For example, if the known location of a landmark or the location of a GPS unit 204 that is not spoofed is 39° 37'07" N 90° 02'49" W, but the location determined by the spoofed GPS unit 204 is 39° 37'20" N 90° 02'41" W, then the onboard controller can determine the difference (e.g., a vector) between these two locations. This vector can be +13" N −8" W in the preceding example. The onboard controller can then apply this vector as a correction to locations determined by the spoofed GPS units 204 until the onboard controller determines that the GPS units 204 are no longer determining incorrect locations (e.g., due to spoofing). For example, the onboard controller can add 13" N and subtract 8" W to coordinates provided by spoofed GPS units 204 to eliminate the spoofing bias. Correcting for the spoofing bias can allow for the vehicle system 802 to continue to operate as normal and uninterrupted with the onboard controller correcting for the spoofing bias. As a result, the other systems of the vehicle system 802 are unaware of and unaffected by the spoofing of one or more GPS units 204.

Additionally or alternatively, the onboard controller can apply conservative restrictions on operation of the vehicle system 802. These conservative restrictions can limit the speed(s) at which the vehicle system 802 can move along the routes and/or can disable operational features of the vehicle system 802. As one example, the onboard controller applies a reduced speed limit restriction on movement of the vehicle system 802. Regardless of operator control of the throttle(s) of the vehicle system 802, faster speed limits of the routes, and/or a trip plan that designates or dictates traveling at a faster speed, the onboard controller can prevent the propulsion system from operating at too great of a throttle setting. The throttle setting limit can be applied by the onboard controller to keep the vehicle system 802 moving at a slower speed, such as 20 kilometers per hour, 15 kilometers per hour slower than a designated upper speed limit of the route, at least 10% slower than a current moving speed of the vehicle system 802, etc.

As another example, the onboard controller prevents one or more operational features of the vehicle system 802 from being used or implemented. These features can include independent DP, which allows for different propulsion-generating vehicles 202 to operate at different throttle settings and/or brake settings at the same time. Preventing this feature from operating can result in the onboard controller of the lead vehicle 202 in the vehicle system 802 being restricted to directing all vehicles 202 to use the same throttle setting and/or same brake setting at the same time during movement of the vehicle system 802. Another feature can be airbrake prompting, which involves the onboard controller generating a visual and/or audible notification for the operator of a vehicle 202 to apply the air brakes of the vehicle 202 and/or vehicle system 802. This feature can be disabled responsive to determining that one or more GPS units 204 are or have been spoofed.

Additionally or alternatively, the onboard controller can transition an operational state of the vehicle system 802 responsive to determining that one or more GPS units 204 are being spoofed or have been spoofed. Transitioning the operational state can involve switching control of the movement and settings of the vehicle system 802 from automatic or semi-automatic control (e.g., where semi-automatic control can involve some, but not all, settings of the vehicle system 802 being manually controlled) to manual control. Another example of transitioning the operational state is automatically slowing and stopping movement of the vehicle system 802 responsive to determining that spoofing has occurred.

Optionally, the onboard controller can disregard or otherwise ignore the GPS unit or units 204 being spoofed. For example, the onboard controller can turn off or otherwise deactivate the spoofed GPS units 204, and/or can disregard locations determined or provided by the spoofed GPS units 204. This can involve taking no action and/or not basing any control operation of the vehicle or vehicle system on the locations determined or provided by the spoofed GPS unit or units 204.

Figure 10:
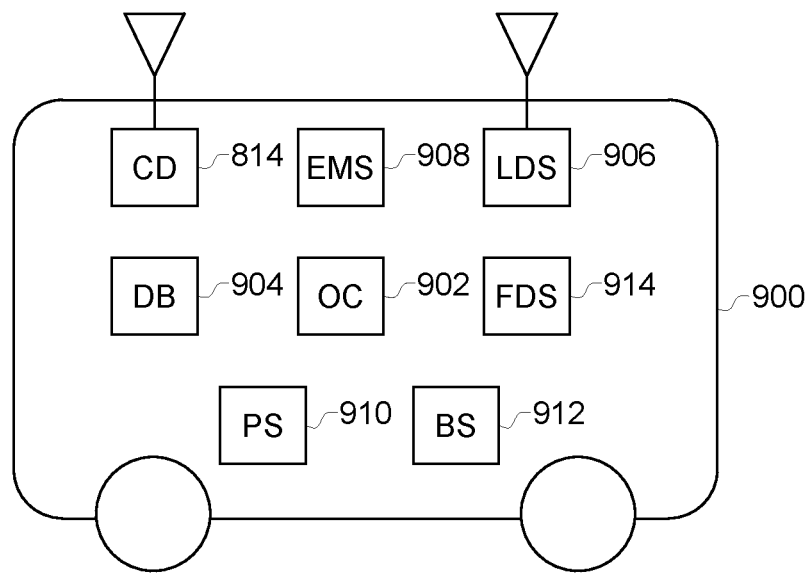
FIG. 10 illustrates one example of a vehicle.

FIG. 10 illustrates one example of a vehicle 900. The vehicle 900 can represent one or more of the vehicles in the vehicle system 802 shown in FIG. 9, such as the vehicle 202. The vehicle 900 includes one or more, or all, components of the security system 800 in one embodiment. The vehicle 900 includes the onboard controller 902 described above ("OC" in FIG. 10), which can represent hardware circuitry that includes and/or is connected with one or more processors (e.g., one or more microprocessors, field programmable gate arrays, and/or integrated circuits) that perform the operations described herein connected with the onboard controller 902. A database 904 ("DB" in FIG. 10) represents the onboard database described herein, and can represent a computer readable memory device, such as one or more computer hard drives, flash drives, optical discs, or the like. A location determination system 906 ("LDS" in FIG. 10) represents one or more of the location determination systems described herein. An energy management system 908 ("EMS" in FIG. 10) represents hardware circuitry that includes and/or is connected with one or more processors (e.g., one or more microprocessors, field programmable gate arrays, and/or integrated circuits) that determine operational settings of the vehicle or vehicle system. The energy management system 908 can determine trip plans that designate or dictate operational settings (e.g., throttle settings, brake settings, speeds, etc.) for the vehicle or vehicle system during movement in a trip. Different operational settings can be designated for different locations along routes, different times during the trip, and/or different distances along the routes. The controller 902 and/or energy management system 908 can compare the operational settings designated by the trip plan with the actual operational settings of the vehicle or vehicle system to determine whether the vehicle or vehicle system is operating at or above the designated operational settings. A difference between actual and designated operational settings can indicate that one or more of the GPS units 204 has been spoofed, as described above.

A propulsion system 910 ("PS" in FIG. 10) generates tractive effort to move the vehicle (and potentially the vehicle system) along the routes. The propulsion system 910 represents one or more engines, alternators, generators, motors, etc., that operate to generate the tractive effort. The propulsion system 910 is controlled based on control signals generated by and communicated from the onboard controller 902. The onboard controller 902 can receive input for controlling the propulsion system 910 from an operator via an input device (not shown, but such as a lever, switch, pedal, button, keyboard, touchscreen, etc.) and/or can automatically control the propulsion system 910 based on previously received instructions (e.g., a trip plan). A brake system 912 ("BS" in FIG. 10) generates braking effort to slow or stop movement of the vehicle (and potentially the vehicle system) along the routes. The brake system 912 represents one or more brakes, such as friction brakes, traction motors (e.g., operating in a dynamic braking or regenerative braking mode), etc. The brake system 912 can be controlled based on control signals generated by and communicated from the onboard controller 902. The onboard controller 902 can receive input for controlling the brake system 912 from an operator via an input device and/or can automatically control the brake system 912 based on previously received instructions (e.g., a trip plan). The communication device 814 described above also is shown in FIG. 10 ("CD" in FIG. 10).

One or more feature detection sensors 914 ("FDS" in FIG. 10) can be disposed onboard the vehicle 900. As described above, the feature detection sensors 914 optionally can be used to determine, provide, or obtain locations of the vehicle 202 and/or a GPS unit 202 that is separate from and/or independent from any signals received from the spoofing device 808 and optionally from the devices 806. In one embodiment, the sensor 914 includes a gyroscope or accelerometer that detects movements, headings, and/or vibrations. The gyroscope or accelerometer can be used to detect when the vehicle 900 moves over or is at a location along the route. For example, multiple gyroscopes or accelerometers on multiple, different vehicles 902 in the vehicle system can determine when the different vehicles are at or traveling over the same location. This can be determined based on unique vibrations created when each vehicle travels over the same location in the route (e.g., a damaged portion of the route, a switch, an intersection, a pothole, etc.), changes in heading of vehicles when each vehicle travels in the same curve, or the like. As described above, as two or more vehicles travel over or near the same location (as determined by the sensor 914), locations determined by GPS units 204 onboard the vehicles 902 (which can be included in and/or represented by the LDS 906 can be used to determine which GPS units 204, if any, are determining incorrect locations due to spoofing.

Another example of the sensor 914 is an input device. For example, the sensor 914 can include or represent a button, switch, lever, touchscreen, pedal, or the like, that is actuated by an operator. The operator can actuate the input device to cause the sensor 914 to generate a signal that is communicated to the onboard controller 902. This signal can indicate when the vehicle 900 is traveling over, by, or near a landmark. Different operators onboard different vehicles 900 can actuate the input devices so that the onboard controllers 902 can determine when the vehicles 900 are at or near the same landmark. As described above, this can be used by the onboard controller 902 to determine which GPS units 204, if any, are being spoofed.

The sensor 914 can represent one or more optical sensors and hardware circuitry that includes and/or is connected with one or more processors (e.g., one or more microprocessors, field programmable gate arrays, and/or integrated circuits) that identify objects within a field of view of the optical sensor(s). For example, the optical sensor can include a camera that obtains photos or videos of objects outside of the vehicle 900. The processor(s) can examine the photos or videos to identify one or more objects. The processor(s) can determine when a designated landmark, such as a sign, signal, gate, building, or the like, is within the field of view of the optical sensor(s). This detection can be reported to the onboard controller 902 so that the onboard controller 902 can determine when the vehicle 900 is at or near the landmark. As described above, this can be used by the onboard controller 902 to determine which GPS unit or units 204 are spoofed.

The sensor 914 can include an antenna and transceiving circuitry for communicating with one or more off-board devices. For example, the sensor 914 can include circuitry for wirelessly communicating and/or communicating via one or more wired connections with an off-board safety system. One such example of a safety system include the positive train control (PTC) safety system used to warn rail vehicles of locations where the rail vehicles are required to slow down or stop. The locations provided by the safety system (e.g., to notify the vehicle 900 to slow or stop) can be used as landmarks by the onboard controller 902 for determining which GPS units 204 are being spoofed.

Figure 11A:
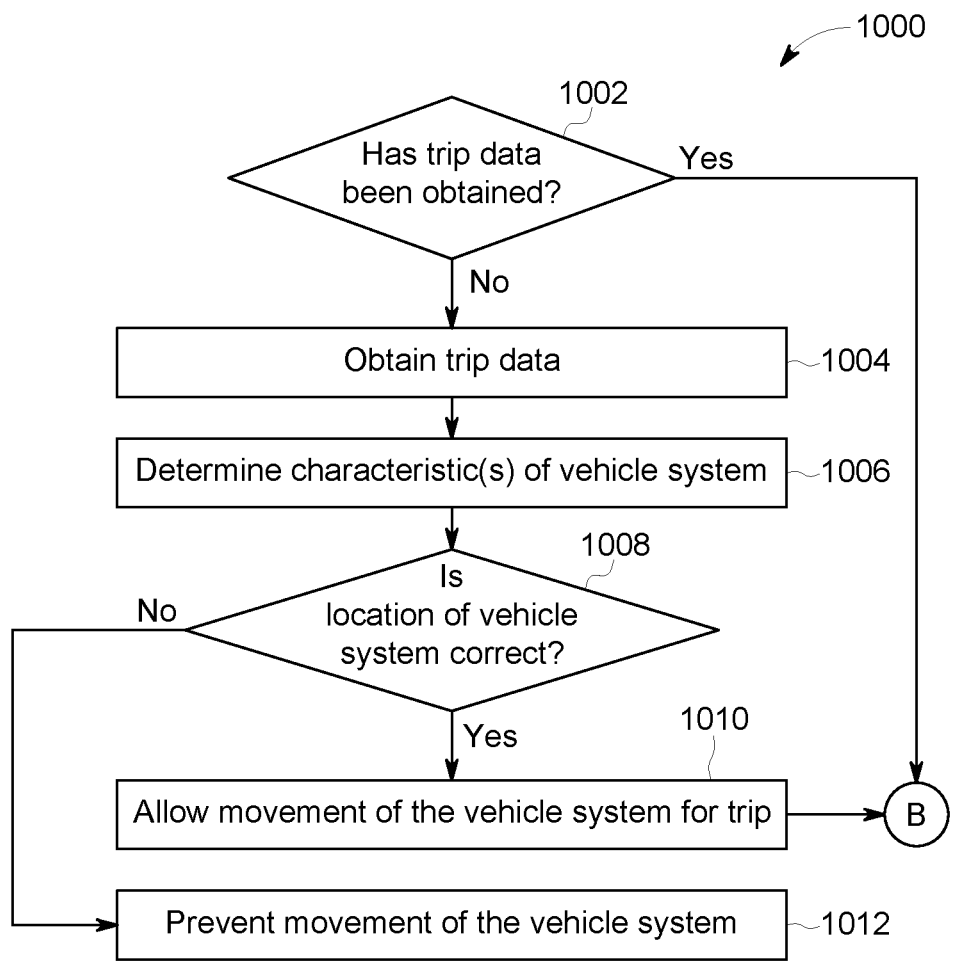
FIGS. 11A and 11B illustrate a flowchart of one embodiment of a method for securing operation of a vehicle or vehicle system from spoofed location determination systems.
Figure 11B:
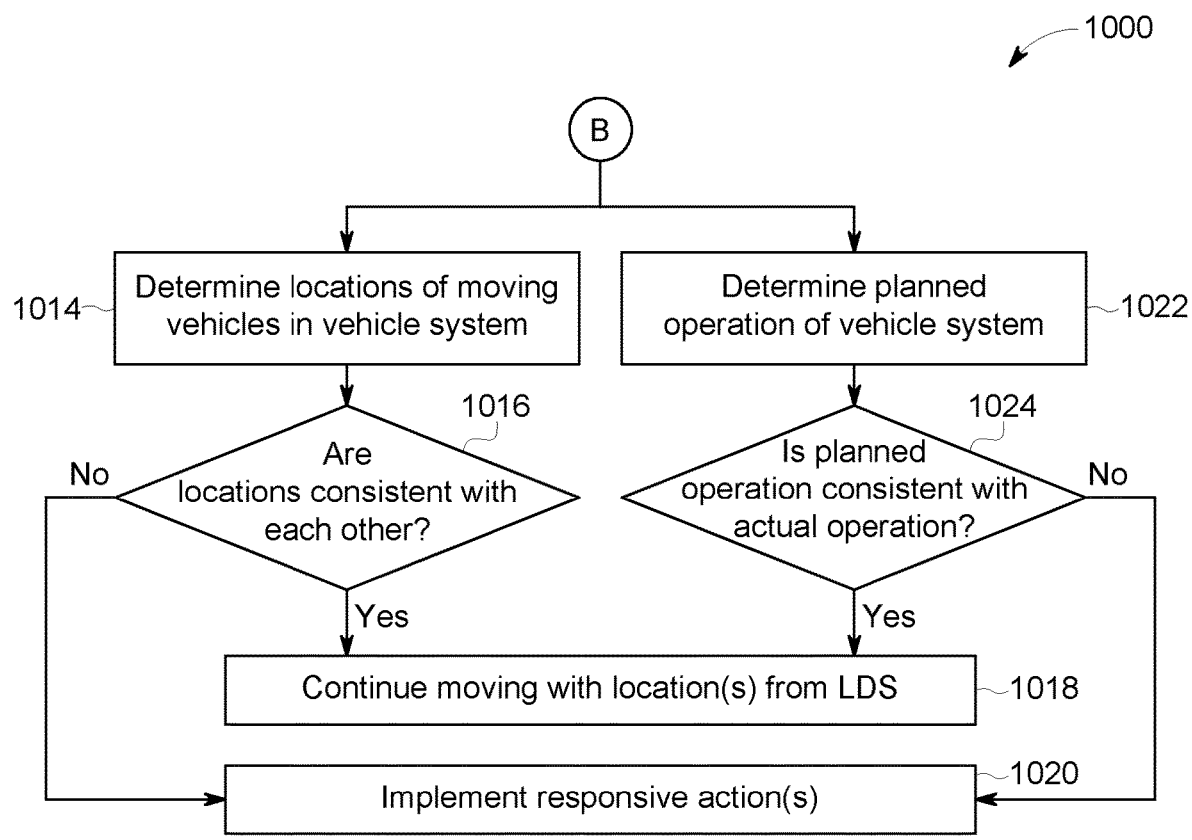

FIGS. 11A and 11B illustrate a flowchart of one embodiment of a method 1000 for securing operation of a vehicle or vehicle system from spoofed location determination systems. The method 1000 describes operations that are performed by various components described above to determine whether one or more location determination systems have been or are being spoofed by spoofing device 808. The method 1000 optionally can represent a software program or application running on one or more components described herein, or can represent an algorithm that can be used to create such a software program or application.

At 1002, a determination is made as to whether the vehicle or vehicle system having a location determination system (e.g., which can include a GPS unit) has obtained trip data for an upcoming trip or an upcoming portion of a trip.

If the trip data has not been obtained, then flow of the method 1000 can proceed toward 1004. Otherwise, flow of the method 1000 can proceed toward 1014 (shown in FIG. 11B).

At 1004, trip data for a trip of the vehicle or vehicle system is obtained. As described above, the onboard controller can obtain the trip data for an upcoming trip or upcoming segment of a trip of the vehicle or vehicle system from the off-board database. This trip data can be selected from other trip data based on the location of the vehicle or vehicle system, as determined by a location determination system.

At 1006, one or more characteristics of the vehicle or vehicle system are determined. The characteristic or characteristics are not determined based on the received trip data in one embodiment. For example, the characteristics can include a determination of whether the communication devices of multiple vehicles in the same vehicle system are communicatively coupled with each other. As another example, the characteristics can include measurement or determination of receipt of a brake signal along a conduit of a brake system, as described above. Optionally, the characteristics can include determination of how much time is needed to recharge pressure in the brake system, also as described above. In another example, the characteristics can include locations of other vehicles in the same vehicle system.

At 1008, the characteristic or characteristics of the vehicle or vehicle system are examined to determine whether the location determined by a location determination system is incorrect. As described above, if one or more communication devices of vehicles that are to be included in the vehicle system (as identified in the trip data) are not communicatively coupled with each other, this can indicate that the vehicles are not actually in the vehicle system. This also can indicate that the trip data is incorrect in that the trip data identifies one or more vehicles as being in the vehicle system when those vehicle or vehicles are not in the vehicle system. Because the trip data is obtained based on a location determined by the location determination system, the incorrect trip data can indicate that the determined location is incorrect. As a result, flow of the method 1000 can proceed toward 1012.

In another example, if the brake signal is not received by one or more vehicles in the vehicle system, and/or the time needed to recharge the pressure in the brake system is taking more time or less time than expected (e.g., the time needed to recharge the brake system based on the number and/or type of vehicles in the vehicle system as identified by the trip data), then the trip data may be incorrect. Because the trip data is obtained based on a location determined by the location determination system, the incorrect trip data can indicate that the determined location is incorrect. As a result, flow of the method 1000 can proceed toward 1012.

Optionally, the locations of the other vehicles in the vehicle system can be examined to determine if the number of vehicles and/or locations or relative locations of the vehicles match or correspond with the trip data. If the number and/or locations of the vehicles do not match or correspond with the number of vehicles and/or locations of the vehicle as indicated by the trip data, then the trip data may be incorrect. Because the trip data is obtained based on a location determined by the location determination system, the incorrect trip data can indicate that the determined location is incorrect. As a result, flow of the method 1000 can proceed toward 1012.

But, if the characteristic or characteristics do not indicate that the trip data is incorrect, then flow of the method 1000 can proceed toward 1010. Optionally, the method 1000 may terminate. At 1010, the vehicle system can begin the trip that is based on the obtained trip data. Flow of the method 1000 can proceed toward 1014 or 1022 (shown in FIG. 11B), or optionally can terminate.

At 1012, the vehicle system is prevented from moving or is prevented from otherwise operating responsive to the trip data being identified as being obtained or based on an incorrect location. For example, because the trip data for an upcoming trip of the vehicle system was obtained based on an incorrect location determined by a GPS unit, the vehicle system can be prevented from moving according to the trip data. The onboard controller can prevent the propulsion system from moving the vehicle system according to the trip data or according to a plan that is generated based on the trip data, or optionally can disable automatic control of movement of the vehicle system and requiring manual control of the vehicle system for the trip.

At 1014 or 1022 (shown in FIG. 11B), the determination of whether one or more GPS units is being spoofed or has been spoofed can be accomplished in a variety of different manners, as described above. In one embodiment, at 1014, locations of the vehicle system are determined during movement of the vehicle system. For example, if the vehicle system is not stationary, the location of GPS units onboard the vehicle system is determined during movement of the vehicle system. The onboard controller can receive the locations determined by multiple location determination systems (e.g., GPS units) onboard different vehicles of the same vehicle system during the movement of the vehicle system.

At 1016, the locations determined by the GPS units are examined to determine if the locations are consistent with each other. The onboard controller can examine the locations and/or changes in the locations determined by multiple GPS units to determine whether one or more, or all, of the GPS units are determining the locations based on signals from the spoofing device. If the location(s) determined by one or more of the GPS units change or indicate movement at a significantly greater rate than the location(s) determined by one or more, or all, other GPS units, then this can indicate that at least one of the GPS units is determining an incorrect location based on the signals received from a spoofing device. As a result, the locations are not consistent with each other, and flow of the method 1000 can proceed toward 1020.

But, if the locations are consistent with each, such as when the locations change or indicate movement at the same or substantially same rate (e.g., less than a 30% difference, less than a 10% difference, or the like), then the onboard controller can determine that the locations are accurate. As a result, flow of the method 1000 can proceed toward 1018.

Optionally, one or more feature detection sensors of the security system 800 are used to determine, provide, or obtain locations of the vehicle 202 and/or a GPS unit 202 that is separate from and/or independent from any signals received from the spoofing device 808 and optionally from the devices 806. The feature detection sensors can be used to determine when a vehicle 202 having a GPS unit 204 is at or near a landmark having a known or previously determined location. The location determined by the GPS unit 204 onboard this same vehicle 202 can be compared with the known location of the landmark (which can be stored in the onboard and/or off-board database and communicated to the onboard controller). The onboard controller compares the location determined by the GPS unit 204 with the known location of the landmark. If the difference between these locations is more than a designated amount (e.g., more than a smallest distance between the route being traveled upon and the landmark, more than 100 meters, or another limit), then the onboard controller can determine that the location determined by the GPS unit 204 is inaccurate. The onboard controller can determine that the inaccurate location is the result of the GPS unit 204 determining the location based on spoofing signals received from the spoofing device 808. As another example, the onboard controller can compare the locations determined by multiple GPS units onboard different vehicles as the vehicles move past the same landmark to determine if the locations are consistent with each other, as described above.

Additionally or alternatively, at 1022, planned operation of the vehicle system is determined. As described above, the planned operation can be obtained by the onboard controller from a trip plan of the vehicle system and/or can be based on the terrain over which the vehicle system is traveling (e.g., based on the speed limits, grade, and/or curvature of the route). Information on the terrain of the route can be obtained from an operator of the vehicle system, from a database (e.g., the onboard database), or another source.

At 1024, a determination is made as to whether actual operation of the vehicle system is consistent with the planned operation of the vehicle system. As described above, the onboard controller can compare actual operation of the vehicle system relative to planned operation of the vehicle system. For example, if the vehicle system is traveling up an incline based on the location determined by a GPS unit and a map of the route, then the speed of the vehicle system should not increase or the tractive effort generated by a propulsion system of the vehicle system should increase. This would indicate that the actual operation of the vehicle system is consistent with the planned operation. If the actual and planned operations are consistent, then flow of the method 1000 can proceed toward 1018.

But, if the speed is not decreasing and the tractive effort of the vehicle system is not increasing, then the onboard controller can determine that the vehicle system is not traveling up an incline. This can indicate that the location determined by the GPS unit is incorrect and may be based on a signal from the spoofing device. As a result, the actual operation is not consistent with the planned operation, and flow of the method 1000 can proceed toward 1020.

At 1018, the vehicle system continues moving along one or more routes with the location(s) determined by the location determination system(s). The onboard controller can continue using the determined locations in order to control movement of the vehicle system, such as by changing throttle settings and/or brake settings automatically or semi-automatically based on the locations. Flow of the method 1000 can return toward 1002 or 1010, or optionally terminates.

At 1020, one or more responsive actions are implemented. For example, responsive to determining that one or more of the GPS units has been or is being spoofed, the onboard controller can determine and correct for a spoofing bias caused by the spoofing of a GPS unit, as described above. Additionally or alternatively, the onboard controller can apply conservative restrictions on operation of the vehicle system, also as described above. As another example, the onboard controller can prevent one or more operational features of the vehicle system from being used or implemented, as described above. Optionally, the onboard controller can transition an operational state of the vehicle system responsive to determining that one or more GPS units are being spoofed or have been spoofed, as described above. The onboard controller optionally can disregard or otherwise ignore the GPS unit or units being spoofed. Flow of the method 1000 can return toward 1002, 1014, or 1022, or optionally terminates.

In one embodiment, a system (e.g., a location determination system) includes one or more processors (e.g., a controller that is onboard a vehicle) configured to determine a location of a vehicle system based on output from a location determination system onboard the vehicle system. The one or more processors also are configured to determine whether the location of the vehicle system as determined by the location determination system is accurate based on one or more of performance of the vehicle system, communication between two or more vehicles in the vehicle system, one or more other locations determined by one or more other location determination systems onboard the vehicle system, and/or operation of a brake system of the vehicle system.

In one example, the one or more processors are configured to implement one or more responsive actions in response to determining that the location of the vehicle system is inaccurate.

In one example, the one or more processors are configured to determine whether the location of the vehicle system is accurate by determining whether communication devices disposed onboard multiple different vehicles in the vehicle system are communicatively coupled with each other.

In one example, the one or more processors are configured to determine whether the location of the vehicle system is accurate by examining a propagation time for a change in pressure in a conduit in a brake system of the vehicle system.

In one example, the one or more processors are configured to determine whether the location of the vehicle system is accurate based on a total amount of air used to pressurize a brake system of the vehicle system.

In one example, the one or more processors are configured to determine whether the location of the vehicle system is accurate by determining different locations of different vehicles in the vehicle system and comparing the locations of the different vehicles with trip data obtained from an off-board location.

In one example, the trip data indicates one or more of a number of vehicles in the vehicle system or relative locations of the vehicles in the vehicle system.

In one example, the one or more processors are configured to obtain the trip data, determine whether the location of the vehicle system is accurate, and prevent the movement of the vehicle system while the vehicle system is stationary.

In one embodiment, a method (e.g., for checking or verifying the accuracy of a location determined by a location determination system) includes obtaining locations determined by separate location determination systems onboard a vehicle system during movement of the vehicle system. The method also includes one or more of comparing actual movement of the vehicle system with planned movement of the vehicle system, and/or comparing the locations determined by the location determination systems. The method also includes determining that one or more of the locations determined by one or more of the location determination systems is inaccurate based on the one or more of comparing the actual movement with the planned movement or comparing the locations and implementing one or more actions responsive to determining that the one or more locations are inaccurate.

In one example, the method includes comparing the actual movement of the vehicle system with the planned movement of the vehicle system. The planned movement of the vehicle system can be based on a trip plan of the vehicle system that dictates different operational settings of the vehicle system at one or more of different locations, different times, and/or different distances along one or more routes.

In one example, the method includes comparing the locations determined by the location determination systems, where the locations that are compared are determined as the location determination systems move over or near a common landmark.

In one example, the method also includes identifying the landmark based on one or more of: input received from an operator, output provided by an optical sensor, or input received from an off-board vehicle safety system.

In one example, the method includes comparing the locations determined by the location determination systems, where the locations are compared by determining whether one or more of the locations changes more than one or more other locations of the locations.

In one example, the one or more actions that are implemented include determining and eliminating a spoofing bias from one or more additional locations that are determined by the location determination systems during movement of the vehicle system.

In one example, the one or more actions that are implemented include preventing the vehicle system from moving faster than a designated speed limit.

In one example, the one or more actions that are implemented include disabling one or more operations of the vehicle system.

In one example, the one or more actions that are implemented include disregarding one or more additional locations determined by at least one of the location determination systems associated with the one or more locations that are inaccurate.

In one embodiment, a system (e.g., a location determination system) includes one or more processors configured to obtain locations determined by separate location determination systems onboard a vehicle system during movement of the vehicle system. The one or more processors also are configured to one or more of compare actual movement of the vehicle system with planned movement of the vehicle system or compare the locations determined by the location determination systems. The one or more processors also are configured to determine that one or more of the locations is inaccurate based on the one or more of comparing the actual movement with the planned movement or comparing the locations. The one or more processors are configured to implement one or more actions responsive to determining that the one or more locations are inaccurate.

In one example, the one or more processors are configured to compare the actual movement of the vehicle system with the planned movement of the vehicle system, and the planned movement of the vehicle system is based on a trip plan of the vehicle system that dictates different operational settings of the vehicle system at one or more of different locations, different times, or different distances along one or more routes.

In one example, the one or more processors are configured to compare the locations determined by the location determination systems, and the locations that are compared are determined as the location determination systems move over or near a common landmark.

In one example, the one or more processors are configured to identify the landmark based on one or more of: input received from an operator, output provided by an optical sensor, or input received from an off-board vehicle safety system.

While only certain features of the inventive subject matter have been illustrated and described herein, many modifications and changes will occur to those skilled in the art. It is, therefore, to be understood that the appended claims are intended to cover all such modifications and changes as fall within the true spirit of the inventive subject matter.

What is claimed is:

1. A system, comprising:
one or more processors configured to determine locations of a vehicle system based on output from location determination systems onboard the vehicle system during movement of the vehicle system,
wherein the one or more processors also are configured to determine whether one or more of the locations of the vehicle system as determined by one or more of the location determination systems is inaccurate based on one or more of comparing actual movement of the vehicle system with planned movement of the vehicle system or comparing the locations determined by the location determination systems, wherein the one or more processors also are configured to determine whether one or more of the locations of the vehicle system is inaccurate by examining a propagation time for a change in pressure in a conduit in a brake system of the vehicle system.

2. A system, comprising:
one or more processors configured to determine locations of a vehicle system based on output from location determination systems onboard the vehicle system during movement of the vehicle system,
wherein the one or more processors also are configured to determine whether one or more of the locations of the vehicle system as determined by one or more of the location determination systems is inaccurate based on one or more of comparing actual movement of the vehicle system with planned movement of the vehicle system or comparing the locations determined by the location determination systems, wherein the one or more processors also are configured to determine whether one or more of the locations of the vehicle system is inaccurate based on a total amount of air used to pressurize a brake system of the vehicle system.

3. A system, comprising:
one or more processors configured to determine locations of a vehicle system based on output from location determination systems onboard the vehicle system during movement of the vehicle system,
wherein the one or more processors also are configured to determine whether one or more of the locations of the vehicle system as determined by one or more of the location determination systems is inaccurate based on one or more of comparing actual movement of the vehicle system with planned movement of the vehicle system or comparing the locations determined by the location determination systems, wherein the one or more processors also are configured to determine whether one or more of the locations of the vehicle system is inaccurate by determining different vehicle locations of different vehicles in the vehicle system and comparing the different vehicle locations of the different vehicles with trip data obtained from an off-board location.

4. The system of claim 3, wherein the trip data indicates one or more of a number of vehicles in the vehicle system or relative locations of the vehicles in the vehicle system.

5. The system of claim 3, wherein the one or more processors are configured to obtain the trip data, determine whether one or more of the locations of the vehicle system is inaccurate, and prevent the movement of the vehicle system while the vehicle system is stationary.

6. A method, comprising:
obtaining locations determined by separate location determination systems onboard a vehicle system during movement of the vehicle system;
one or more of:
comparing actual movement of the vehicle system with planned movement of the vehicle system; or
comparing the locations determined by the location determination systems;
determining that one or more of the locations determined by one or more of the location determination systems is inaccurate based on the one or more of comparing the actual movement with the planned movement or comparing the locations; and
implementing one or more actions responsive to determining that the one or more locations are inaccurate, wherein the method includes comparing the locations determined by the location determination systems, and wherein the locations are compared by determining whether one or more of the locations changes more than one or more other locations of the locations.

7. A method, comprising:
obtaining locations determined by separate location determination systems onboard a vehicle system during movement of the vehicle system;
one or more of:
comparing actual movement of the vehicle system with planned movement of the vehicle system; or
comparing the locations determined by the location determination systems;
determining that one or more of the locations determined by one or more of the location determination systems is inaccurate based on the one or more of comparing the actual movement with the planned movement or comparing the locations; and
implementing one or more actions responsive to determining that the one or more locations are inaccurate, wherein the one or more actions that are implemented include determining and eliminating a spoofing bias from one or more additional locations that are determined by the location determination systems during movement of the vehicle system.

8. The method of claim 7, wherein the one or more actions that are implemented include preventing the vehicle system from moving faster than a designated speed limit.

9. The method of claim 7, wherein the one or more actions that are implemented include disabling one or more operations of the vehicle system.

10. The method of claim 7, wherein the one or more actions that are implemented include disregarding one or more additional locations determined by at least one of the location determination systems associated with the one or more locations that are inaccurate.

* * * * *